United States Patent [19]

Zikeli et al.

[11] Patent Number: 5,968,434
[45] Date of Patent: *Oct. 19, 1999

[54] PROCESS OF MAKING CELLULOSE MOLDINGS AND FIBERS

[75] Inventors: Stefan Zikeli, Regau; Ernst Rauch, Schörfling; Hermann Koberger, Zipf; Friedrich Ecker, Timelkam; Hartmut Rüf, Vöcklabruck; Raimund Jurkovic; Franz Schwenninger, both of Lenzing, all of Austria

[73] Assignee: Lenzing Aktiengesellschaft, Lenzing, Austria

[*] Notice: This patent is subject to a terminal disclaimer.

[21] Appl. No.: 09/095,340

[22] Filed: Jun. 10, 1998

Related U.S. Application Data

[62] Continuation of application No. 08/480,045, Jun. 6, 1995, Pat. No. 5,798,125, which is a continuation of application No. 08/142,313, filed as application No. PCT/AT93/00053, Mar. 17, 1993, Pat. No. 5,589,125.

[30] Foreign Application Priority Data

Mar. 17, 1992 [AT] Austria .................................. A537/92

[51] Int. Cl.⁶ ...................................................... D01F 2/02
[52] U.S. Cl. ............... 264/187; 264/211.14; 264/211.16; 264/237
[58] Field of Search .............................. 264/187, 211.13, 264/211.14, 211.16, 211.19, 237

[56] References Cited

U.S. PATENT DOCUMENTS

| | | |
|---|---|---|
| 1,933,587 | 11/1933 | Dreyfus et al. . |
| 1,934,618 | 11/1933 | Briggs et al. . |
| 2,131,810 | 10/1938 | Kinsella et al. . |
| 2,179,181 | 11/1939 | Graenacher . |

(List continued on next page.)

FOREIGN PATENT DOCUMENTS

| | | |
|---|---|---|
| 7708471 | 6/1979 | Austria . |
| 272489 | 11/1989 | Austria . |
| 40482 | 11/1981 | European Pat. Off. . |
| 50483 | 4/1982 | European Pat. Off. . |

(List continued on next page.)

OTHER PUBLICATIONS

Final Decision in Patent Interference No. 104,034 (mailed Sep. 3, 1998).
Final Decision in Patent Interference No. 104,035 (mailed Sep. 3, 1998).
English language abstract of EP 40 482.
English language abstract of EP 50 483.
English language abstract of EP 105 169.
English language abstract of EP 442405.
English language abstract of JP 57–61113.
English language abstract of DE 28 30 685.
English language abstract of DE 37 08 168.
English language abstract of DD 218 121.
English language abstract of Austrian application AT 2724/89.

*Primary Examiner*—Leo B. Tentoni
*Attorney, Agent, or Firm*—Baker & Botts LLP

[57] ABSTRACT

Figure 1:
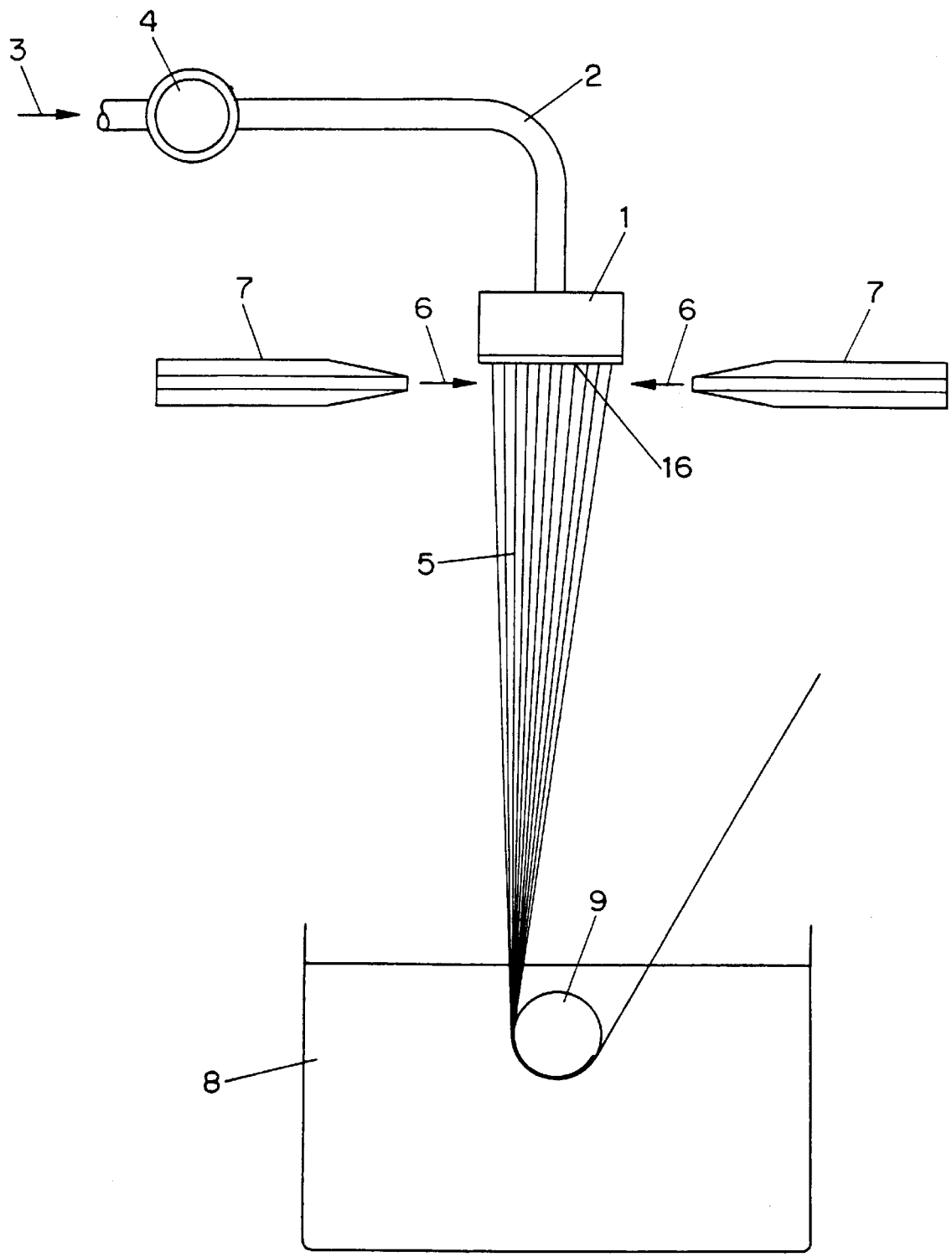

To prepare cellulose mouldings, a solution of cellulose in a tertiary amine-oxide is moulded in a hot state and the moulded solution is introduced into a precipitation bath in order to precipitate the contained cellulose, wherein the hot moulded solution is cooled before introduction into the precipitation bath. Cooling occurs immediately after the moulding process and preferably consists of blowing air horizontally on to the cellulose moulding. The process according to the invention allows spinning of the cellulose solution with a high fiber density without the spun fibers sticking together after emerging from the spinneret. In spite of the high fiber density, it furthermore allows the use of a long air gap between the spinneret and the precipitation bath, by which means sufficient time is generated in the spinning process to affect the textile properties of the fibers by drawing at the die (FIG. 1).

2 Claims, 4 Drawing Sheets

U.S. PATENT DOCUMENTS

| | | |
|---|---|---|
| 2,222,797 | 11/1940 | Dreyfus et al. . |
| 2,284,028 | 5/1942 | Ubbelohde . |
| 3,118,012 | 1/1964 | Kilian . |
| 3,299,469 | 1/1967 | Charlton . |
| 3,824,050 | 7/1974 | Balk . |
| 3,836,346 | 9/1974 | Stalego . |
| 3,858,386 | 1/1975 | Stofan . |
| 3,969,462 | 7/1976 | Stofan . |
| 3,976,411 | 8/1976 | Rahlfs et al. . |
| 3,996,321 | 12/1976 | Weinberger . |
| 4,038,357 | 7/1977 | Boyes et al. . |
| 4,078,034 | 3/1978 | Lewis . |
| 4,080,143 | 3/1978 | Upmeier . |
| 4,115,048 | 9/1978 | Alderfer et al. . |
| 4,144,080 | 3/1979 | McCorsley, III . |
| 4,261,943 | 4/1981 | McCorsley, III . |
| 4,285,646 | 8/1981 | Waite . |
| 4,305,703 | 12/1981 | Lupke et al. . |
| 4,340,559 | 7/1982 | Yang . |
| 4,440,711 | 4/1984 | Kwon et al. . |
| 4,526,597 | 7/1985 | Olinger et al. . |
| 4,601,649 | 7/1986 | Upmeier . |
| 4,643,750 | 2/1987 | Glaser . |
| 4,712,988 | 12/1987 | Broaddus et al. . |
| 4,713,290 | 12/1987 | Kwon et al. . |
| 4,804,511 | 2/1989 | Dieper et al. . |
| 4,836,507 | 6/1989 | Yang . |
| 4,838,774 | 6/1989 | Balk . |
| 4,850,836 | 7/1989 | Maeda et al. . |
| 5,178,814 | 1/1993 | Lemond . |
| 5,230,905 | 7/1993 | Fare et al. . |
| 5,252,284 | 10/1993 | Jurkovic et al. . |

FOREIGN PATENT DOCUMENTS

| | | |
|---|---|---|
| 105169 | 4/1984 | European Pat. Off. . |
| 442405 | 8/1991 | European Pat. Off. . |
| 494852 | 1/1992 | European Pat. Off. . |
| 356419 | 12/1992 | European Pat. Off. . |
| 898802 | 5/1945 | France . |
| 2844163 | 5/1979 | Germany . |
| 2830685 | 12/1980 | Germany . |
| 3406346 | 10/1984 | Germany . |
| 218121 | 1/1985 | Germany . |
| 3708168 | 9/1988 | Germany . |
| 57-16113 | 3/1981 | Japan . |
| 61-19704 | 6/1986 | Japan . |
| 807248 | 1/1959 | United Kingdom . |
| 957534 | 5/1964 | United Kingdom . |
| 1017855 | 1/1966 | United Kingdom . |

PROCESS OF MAKING CELLULOSE MOLDINGS AND FIBERS

This is a continuation of application Ser. No. 08/480,045 filed Jun. 06, 1995 which issued as U.S. Pat. No. 5,798,125 on Aug. 26, 1998 which is incorporated by reference herein, which is a continuation of U.S. Ser. No. 08/142,313 filed Nov. 16, 1993 which is a 371 of PCT/AT 93/00053, Mar. 17, 1993 which issued as U.S. Pat. No. 5,589,125 on Dec. 31, 1996.

The invention concerns a process for the preparation of cellulose mouldings in which a solution of cellulose in a tertiary amine-oxide is moulded in a hot state and the moulded solution is introduced into a precipitation bath in order to precipitate the contained cellulose, as well as a device for carrying out the process.

It is known from U.S. Pat. No. 2,179,181 that tertiary amine-oxides are capable of dissolving cellulose and that cellulose mouldings can be obtained from these solutions by precipitation. A process for the preparation of such solutions is known for example from EP-A 0 356 419. According to this publication, a suspension of cellulose is firstly prepared in aqueous tertiary amine-oxide. The amine-oxide contains up to 40 weight % water. The aqueous cellulose suspension is heated and water is removed under reduced pressure until the cellulose goes into solution. The process is carried out in a specially-developed stirring device which can be evacuated.

A process of the type described at the start is known from DE-A 2 844 163 and from DD-A 218 121. In order to prepare cellulose fibres or cellulose films, an air space or an air gap is arranged between the spinneret and the precipitation bath in order to achieve drawing at the die. This drawing is necessary because drawing the fibre becomes very difficult after the moulded spinning solution makes contact with the aqueous precipitation bath. The fibre structure produced in the air gap is fixed in the precipitation bath.

In the air gap however the danger exists that the individual fibres which are not yet coagulated will stick to one another or will fuse together because of their extremely high stickiness, thus making the spinning of fibres impossible. In the nature of things, this danger of sticking together is all the greater, the longer is the gap between the die plate and the surface of the precipitation bath (the air space). On the other hand, a long gap would be advantageous because a certain time is necessary for orientation of the cellulose molecules. In order to minimise this danger of sticking together when using large air gaps, the hole density in the spinneret must be reduced which in turn has an adverse effect on the economics of the spinning process.

Whilst the use of a short air gap does allow spinning using a high hole density, it also impairs the reliability of the spinning process since due to the capillary action of the filaments, liquid from the precipitation bath gets onto the exit side of the spinning bores or spinning holes. The result is that the fibre material, which is moulded but still fluid, does not undergo drawing, ie, the desired fibre thickness is not achieved. At the same time it can be shown that the textile values relating to the strength and to the elongation of the fibres are scarcely affected by the shortened dwell time in the air gap.

It is stipulated in DD-A 218 121 that shortening the length of the drawing gap at the die, with its associated reduction. In the danger of individual fibres sticking together, can be achieved without any effect on the reliability of spinning or on the fibre strength by the addition to the spinning solution of a polyalkylene ether, especially polyethylene glycol. Reference is also made in DE-A 2 844 163 to the extreme stickiness of the spun fibres and to overcoming this problem, wherein among other things spraying the fibres in the air gap with a liquid which does not dissolve cellulose is proposed.

Tests have shown that not all the proposed solutions are satisfactory in respect of either the achievable spinning-fibre density or the effect on the textile properties of the cellulose fibres. According to DE-A 2 844 163, the distance between the spinneret and the surface of the precipitation bath amounted to 270 mm, but this apparently only allowed a spinning-fibre density of about 0.0046 fibres/mm$^2$ (corresponding to a spinning-hole density in the spinneret of 0.0046 holes/mm$^2$). Spinning on a large scale using such a small hole density is unthinkable. To do this, spinnerets with a hole density of more than 0.1 holes/mm$^2$ must be used. Such spinnerets are described for example in the Austrian Patent Application A 2724/89.

The invention is now formulated here and concerns the problem of improving that process mentioned at the start so that it allows the stickiness of freshly extruded cellulose mouldings to be reduced without the addition of any kind of additive to the spinning material and without spraying the surface of the moulding with a precipitating agent. In particular the invention is set the problem of providing a process for the preparation of cellulose fibres wherein by using a spinneret with a high hole density a dense bundle of fibres can be spun which, in order to give better control over the textile properties of the spun fibres, is led over a large air gap to the precipitation bath.

In spite of this dense bundle of fibres and in spite of the large air gap, there should be no adhesion between individual fibres.

The process according to the invention is characterised by the cooling of the hot moulded spinning solution before it is brought into contact with the precipitation bath, whereby the cooling occurs immediately after moulding. The best way of cooling the moulded solution is by exposing it to a gas stream.

In the preparation of cellulose fibres by the moulding of cellulose solutions using a spinneret, the use of the gas stream essentially at right angles to the direction of spinning has especially proved its worth. Surprisingly it has been shown that the problem of sticking as described above can be overcome in a simple fashion wherein the freshly spun fibres are exposed, for example, to an air stream. Even simple blowing onto the fibre bundle with a fan ensures that spinnerets with a hole density of up to 0.7 holes/mm$^2$ can be used and an air gap up to 70 mm long can be chosen without any sticking of individual fibres occurring in the air gap.

The process according to the invention is also suitable for the preparation of cellulose films wherein the cellulose solution is led through a film-forming device and the process is characterised in that the direction of film formation is essentially at right angles to the gas stream.

When using spinnerets with still higher hole densities, the flow profile provided by a fan is no longer adequate to ensure uniform cooling of the whole fibre bundle. In this case, a preferred embodiment of the process according to the invention consists of exposing the hot moulded solution to at least two streams of gas wherein the gas streams are best applied to opposite sides of the moulded solution.

One embodiment of this variant of the process according to the invention for preparing cellulose fibres consists of leading the hot cellulose solution through a spinneret with a multiplicity of spinning holes which are essentially arranged in a ring shape, wherein the hot moulded solution which occurs as spun fibres is exposed to the two gas streams so that one gas stream is directed radially to the outside and the other is directed radially to the inside.

In this way it is possible to enhance the cooling effect to such an extent that fibre bundles having a density up to 1.4 fibres/mm$^2$ can be led over a gap of at least 50 mm without the individual fibres sticking to one another.

An amount of heat of at least 20 kJ/kg solution in particular, preferably between 20 and 350 kJ/kg solution, is removed from the hot moulded solution during the cooling process.

The invention also concerns a device for the preparation of cellulose fibres from a solution of cellulose in a tertiary amine-oxide, wherein the device consists of a spinneret with spinning holes. The device according to the invention is characterised in that an entry for cooling gas, which is used to cool the cellulose fibres, is provided immediately downstream of the spinning holes.

A special embodiment of the device according to the invention consists of the spinning holes in the spinneret being arranged essentially in the shape of a ring with the entry for cooling gas being provided in the centre of the ring formed by the spinning holes.

For uniform cooling of very dense fibre bundles which are extruded from a spinneret with a hole density of more than 0.7 holes/mm$^2$, the provision of yet another stream of cooling gas directed onto the fibre bundle from the outside has proved to be advantageous. This configuration of the device according to the invention thus exhibits a further entry for cooling gas, which is positioned outside the ring-shaped spinneret. In this case the ring-shaped fibre bundle is exposed to cooling gas not only at its inner side but also at its outer side. It has been shown that the cooling effect is substantially increased by this measure.

Flow devices or baffles for homogenising the flow of cooling gas may be provided in the entry for cooling gas which is situated in the centre of the ring-shaped spinneret plate.

A further implementation of the device according to the invention consists of the spinning holes in the spinneret being arranged in the form of a group.

Figure 2:
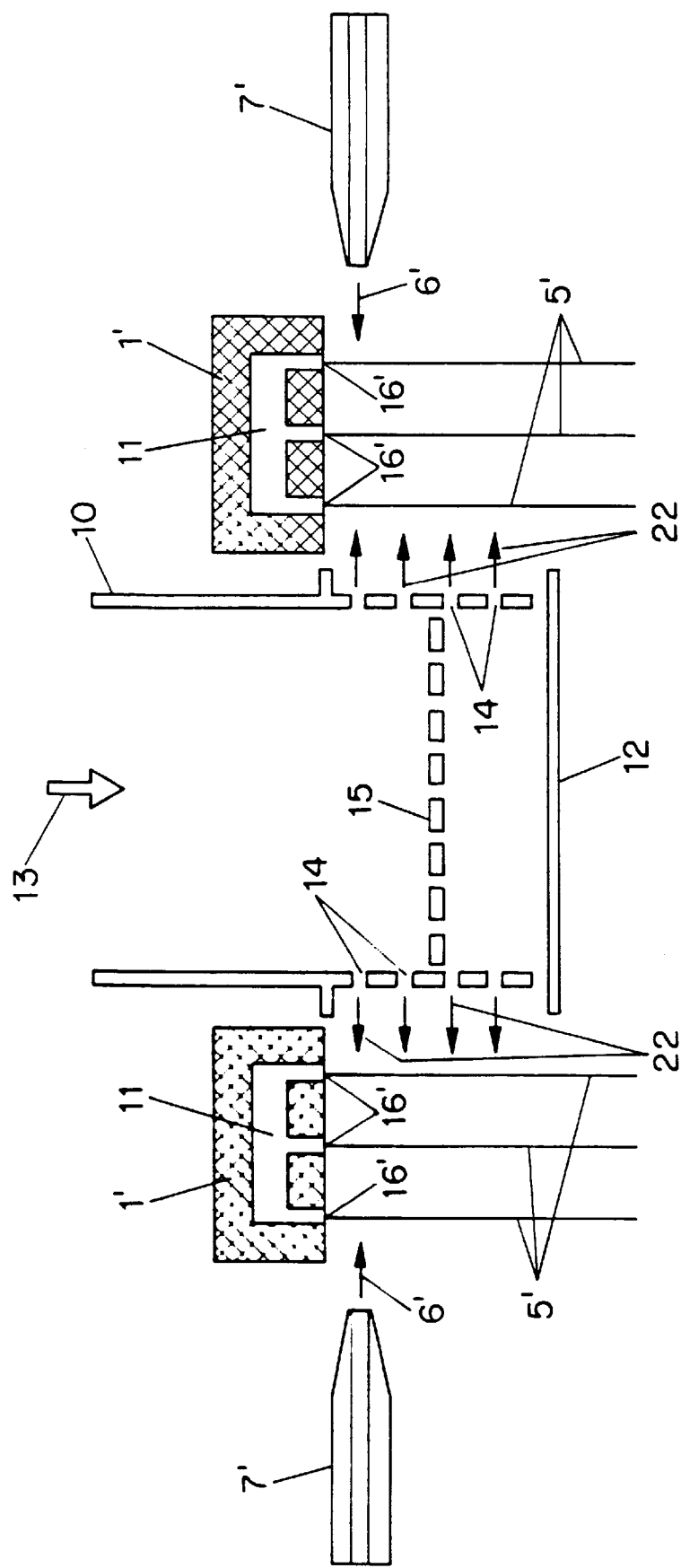
Figure 3:
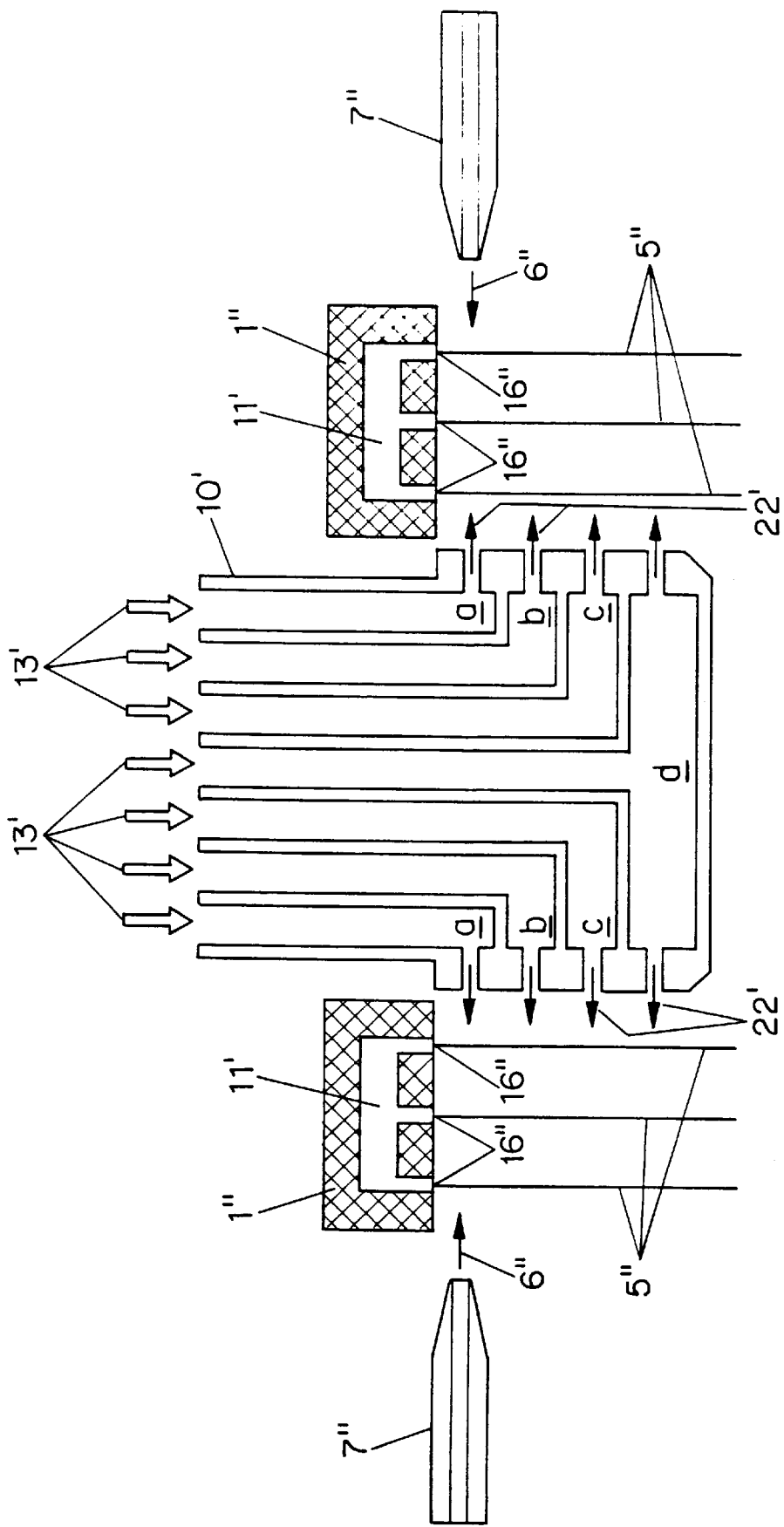

The process according to the invention is yet further explained by means of the Drawings where FIG. 1 schematically shows a preferred embodiment of the process according to the invention for the preparation of cellulose fibres and FIGS. 2, 3 and 4 represent preferred embodiments of the spinning device according to the invention.

In FIG. 1 a heatable spinneret 1 is shown (the heating is not represented) which is fed through a feed line 2 with spinning material 3, ie, hot cellulose solution at a temperature of about 100° C. The pump 4 is for metering the spinning material and for adjusting the pressure which is necessary for extrusion. The fibre bundle 5 which is extruded from the spinneret 1 through spinning holes 16 is cooled with an inert gas 6, preferably air, which is directed through gas nozzles 7 onto the fibre bundle 5 leaving the spinneret 1. By means of this gas flow, spinnerets can be used which have a high hole density without the spun fibres sticking together during the spinning process.

The fibre bundle 5 passes through an air gap, which is defined as the distance between the spinneret 1 and the surface of the precipitation bath 8, then passes into the precipitation bath 8, is collected together by a guide roll 9 and is drawn off. The blowing-on of gas and the cooling of the fibre bundle respectively according to the invention enables a relatively long air gap to be used, so that sufficient time is available during the drawing of the fibres for orientation of the cellulose molecules to occur. Drawing is achieved by hauling-off the fibre bundle 5 with the roll 9 at a velocity which is greater than that at which it leaves the spinneret 1.

The gas nozzles 7 surround the fibre bundle 5 in the shape of a ring and they can either be attached directly to the spinneret 1 or they can form a specially constructed unit which is once again attached to the spinneret 1. Naturally the transfer of heat from the hot spinning material 3 in the spinneret 1 into the cooling gas 6 should be prevented as far as possible, which can be simply achieved by suitable insulation. To achieve the effect according to the invention, it is simply crucial that the stream of cooling gas is directed onto the fibre bundle 5 which is just leaving the spinneret 1, preferably in a plane which is substantially parallel to that plane formed by the spinning holes 16.

Further embodiments of the spinning device according to the invention which is represented in FIG. 1, consisting of spinneret and cooling-gas nozzles, are shown schematically in FIGS. 2, 3 and 4. With the aid of these embodiments, even more dense fibre bundles can be processed, ie, spinnerets with still higher hole densities can be used.

FIGS. 2 and 3 show cross sections of annular, heatable (heating not shown) spinnerets 1', 1" and a device for blowing-on gas consisting of gas nozzles 7', 7" and a central entry 10, 10' for cooling gas 13, 13'. The annular spinnerets 1', 1" are fed with spinning material 11, 11' at point not shown in the Drawing which is spun to give a dense annular fibre bundle 5', 5" onto which cooling gas is blown both on the inside and on the outside. The direction of blowing is indicated in the two Figures by the arrows 22, 22' and 6', 6" respectively.

The implementations of the device according to the invention shown in the two Figures differ from one another in the central entry point 10, 10' for cooling gas 13, 13'. Entry point 10 is designed as a simple tube with a baffle plate 12 and through-ways 14. Entry point 10 can be fed with cooling gas 13 for example by means of a fan not shown in the Drawing. The gas stream 13 strikes the baffle plate 12, is deflected horizontally, emerges from the through-ways 14 as gas stream 22 and strikes the annular fibre bundle 5' at its inner side. A body 15 for homogenising the gas flow can be provided in the feed point 10. By blowing radially onto the fibre bundle 5' both from the outside and from the inside, the cooling effect is substantially increased.

The central entry point 10' shown in FIG. 3 has several separate chambers a–d which are fed with cooling gas 13'. By virtue of this segmentalised construction of entry point 10', differing cooling media or differing conditions can be used when blowing onto the fibre bundle. With the configuration shown in FIG. 3 it is also possible to expose the fibre bundle to the cooling gas over a longer distance and thus be able yet more favourably to influence the textile values of the cellulose fibres.

The gas nozzles 7', 7" which are in the shape of a ring surrounding the annular fibre bundle 5', 5" can either be attached directly to the spinnerets 1', 1" or they can form a separately constructed unit which is once again attached to the spinnerets 1', 1". With regard to the constructive design, that which is implemented in FIG. 1 applies here. The same also applies to the entry points 10, 10'.

It is also possible to integrate into the spinnerets the air nozzles which are used for blowing onto the fibres, wherein heat insulation is naturally to be given special consideration. Just such an embodiment is shown in FIG. 4, wherein FIG. 4a shows a cross section of a device according to the invention with a cylindrical spinneret housing (which is heatable but the heating is not shown) whilst FIG. 4b shows a section of this embodiment from below.

Figure 4A:
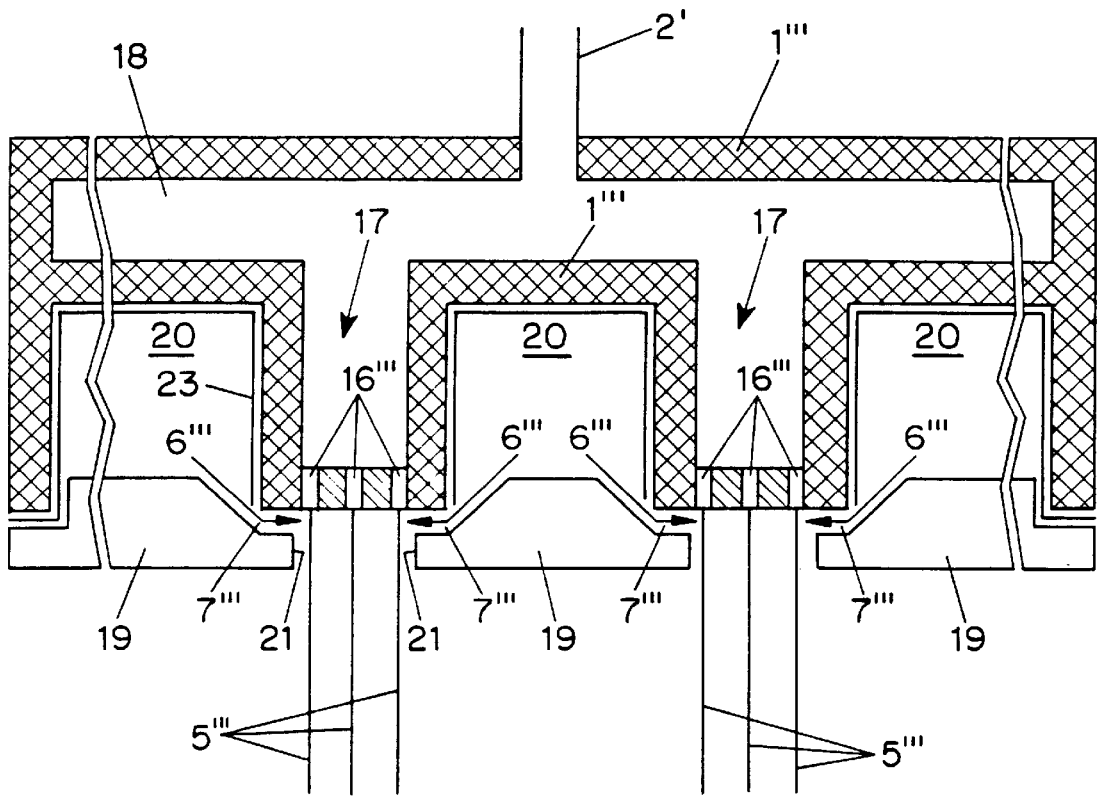

FIG. 4a shows a schematic representation of a spinneret 1''', wherein spinning holes 16''' are provided at the head of cylindrical channels 17. The entry point of the spinning material 18 into the spinneret 1''' is shown as 2'. During the spinning process, the spinning material in the channel 17 is compressed and is extruded through the spinning holes 16'''. The spinneret 1''' is covered on its capillary side by a circular plate 19 containing circular cut-outs 21 which are so shaped and so positioned on the plate 19 that the extruded fibres 5''' emerge without hindrance and can be drawn off. This covering of the spinneret 1''' creates a cavity 20 into which cooling gas is led (not shown). Plate 19 is so designed and is so applied to the spinneret 1''' that it does not touch the heads of the channel 17 but forms annular gaps 7''' through which the cooling gas can emerge and flow horizontally onto the extruded fibre bundle 5''' (shown in FIG. 4a by arrow 6''' in gap 7'''). The annular gap 7''' thus fulfils the function of the gas nozzles 7, 7', 7'' which are used in the form of a circle in the implementations according to FIGS. 1, 2 and 3 respectively.

By means of this special construction, a ring of cooling gas is thus formed around each fibre bundle 5''' which permits the efficient cooling of a dense fibre bundle 5'''.

Figure 4B:
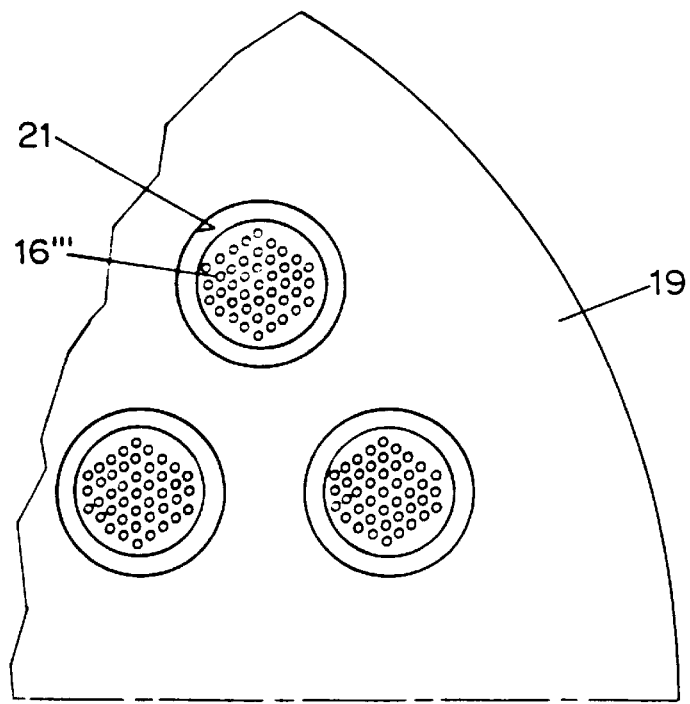

FIG. 4b gives a view from below of the spinneret 1''', showing a section of plate 19, the cut-outs 21 from which the cooling gas flows, and also the spinning holes 16'''.

The space 20 is clad on the spinneret side with insulation 23 to prevent heat transfer from the spinning material 18 to the cooling gas in space 20.

The invention is still further explained by the following Examples.

EXAMPLES 1–5

A cellulose solution was prepared according to the process described in EP-A 0 356 419, and then filtered and spun in a hot state according to the process represented in FIG. 1, wherein the embodiment of the spinning device shown schematically in FIG. 2 was used in Examples 1–4 whilst that shown in FIG. 4 was used in Example 5.

In the Table are given for all 5 Examples: the weight of cellulose solution spun per hour (kg/h), its composition (wt %), its temperature of spinning (° C.), the hole density (number of holes/mm$^2$) in the spinneret, the diameter of the spinning holes ($\mu$), the feed rate of inner cooling air (m$^3$/h), its temperature (° C.), the temperature (° C.) of the emerging inner cooling air, the feed rate of outer cooling air (m$^3$/h), its temperature (° C.), the amount of heat removed per kilogram of spun cellulose solution (kJ/kg), the length of the air gap (mm), the fibre draw-ratio, the NMMO content of the precipitation bath (wt % NMMO) and the end titre of the fibres prepared (dtex).

TABLE

| EXAMPLE | 1 | 2 | 3 | 4 | 5 |
|---|---|---|---|---|---|
| Throughput of spinning material | 45.6 | 24.67 | 7.84 | 9.10 | 18.80 |
| Cellulose | 11.86 | 11.83 | 12.86 | 12.21 | 11.00 |
| NMMO | 78.25 | 77.57 | 75.35 | 76.68 | 77.22 |
| Water | 9.89 | 10.60 | 12.65 | 11.11 | 11.78 |
| Temperature | 112 | 112 | 110 | 113 | 90 |
| Hole density | 0.68 | 0.60 | 0.18 | 1.14 | 0.27 |
| Hole diameter | 100 | 100 | 100 | 100 | 130 |
| Inner cooling (amount) | 100 | 170 | 70 | 200 | 50 |
| Temperature of cooling air | -6 | -5 | 5 | 4.9 | 24 |
| Temperature of exit cooling air | 32 | 32.8 | 34.2 | 30.1 | 31 |
| Outer cooling (amount) | 23 | 27 | 12 | 17 | — |
| Temperature of cooling air | 24 | 24 | 24 | 17.3 | — |
| Heat removed | 32.37 | 103.46 | 152.90 | 338.24 | 28.72 |
| Air gap | 70 | 60 | 140 | 65 | 85 |
| Fibre draw ratio | 10.6:1 | 8.03:1 | 4.34:1 | 13.49:1 | 13.02:1 |
| Precipitation bath | 20 | 20.9 | 20.8 | 29.2 | 23.8 |
| End titre | 1.3 | 1.3 | 3.13 | 1.7 | 1.36 |

In none of the Examples was any sticking together of individual fibres observed.

We claim:

1. A process for the preparation of cellulose fibres from a solution of cellulose in a tertiary amine oxide comprising the steps of:

passing a hot solution of cellulose in a tertiary amine oxide through a ring-shaped spinneret to form an annular bundle of spun fibres from said solution, cooling said annular bundle of spun fibres only with a stream of cooling gas directed radially outward towards said fibres from a location within said annular bundle of fibres, said stream of cooling gas being directed substantially at right angles to the direction of spinning and immediately after the spun fibres emerge from said spinneret, drawing said bundle of spun fibres through an air gap, and directing said drawn fibres into an aqueous precipitation bath to produce cellulose fibres.

2. The process according to claim 1 wherein said precipitated cellulose fibres are directed downwardly from said air gap into said precipitation bath and then upwardly out of said precipitation bath.

\* \* \* \* \*